United States Patent Office 2,823,060
Patented Feb. 11, 1958

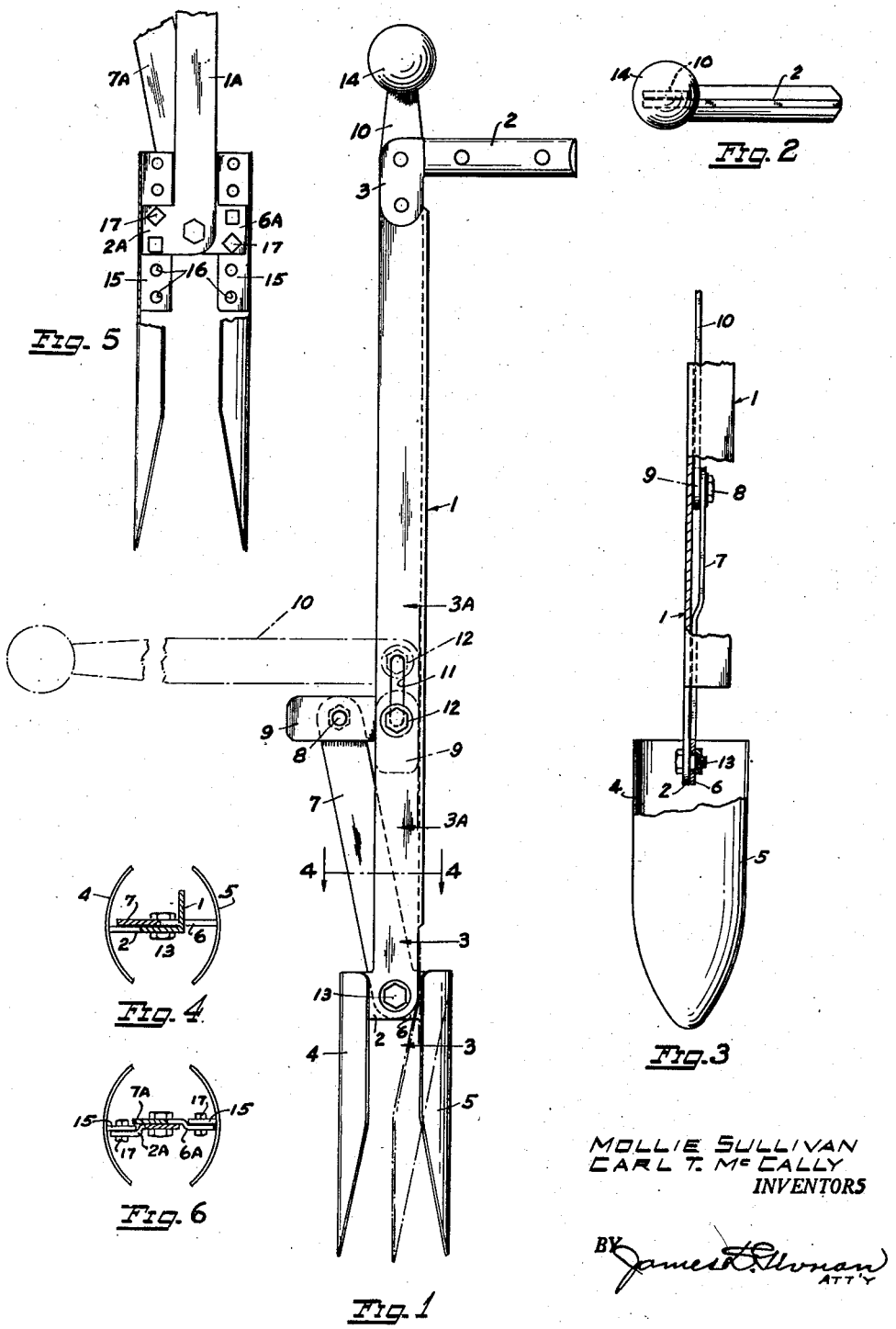

2,823,060

GARDEN DIGGING TOOL

Mollie Sullivan and Carl T. McCally, Portland, Oreg.

Application November 16, 1953, Serial No. 392,148

3 Claims. (Cl. 294—50.9)

This invention relates to improvements in garden digging tools and more particularly to a tool for digging holes for planting bulbs, small plants, flowers, and the like which was heretofore accomplished by using a single bladed trowel.

It is one of the principal objects of our invention to provide a tool of this character which utilizes two oppositely disposed cooperating digging blades conveniently and effectively operable by a user in a standing position through the medium of an elongated handle element and an actuating lever.

A further object is the provision of means for applying downward foot pressure to the tool in an open position for thrusting the digging blades into the ground to any desired depth.

The foregoing and other objects will appear as our invention is more fully hereinafter described in the following specification, illustrated in the accompanying drawings, and finally pointed out in the appended claims.

In the drawing:

Figure 1 is a front view of a digging tool made in accordance with our invention.

Figure 2 is a plan view of the top end of Figure 1.

Figure 3 is a fragmentary side view of Figure 1 and partly in section approximately along the lines 3—3 and 3A—3A in Figure 1.

Figure 4 is a sectional top plan view taken along the line 4—4 of Figure 1.

Figure 5 is a fragmentary view of a pair of modified digging blades.

Figure 6 is a top plan view of Figure 5.

Referring now more particularly to the drawing:

Reference numeral 1 indicates a vertical handle element of right angular formation in cross-section and provided at its top end with a hand grip 2 secured at right angles thereto as at 3. The bottom end of the handle element 1 is turned at right angles as at 2 for attachment by welding or the like to the top end of a digging blade indicated at 4. A companion digging blade 5 is secured by welding or the like at its top end to an angular bottom end portion 6 of an arm 7 whose top end is pivotally attached as at 8 to a right angular integral portion 9 of an actuating lever 10 at the bottom end thereof. The lever 10 and hence the portion 9 are pivotally and slidably attached to the handle element 1 by means of a vertical slot 11 in the handle and a pivot bolt 12 extending through the slot and secured to the corner portion of the handle and the inner end of the integral portion 9 thereof.

The bottom ends of the handle element and the arm 7 are pivotally interconnected by means of a pivot bolt 13. The top end of the actuating lever 10 is provided with a hand grip in the form of a ball 14.

In the modified form of digging blades shown in Figures 5 and 6 each blade is provided with an inwardly extending web 15 provided with vertically spaced apart apertures 16 for adjustable attachment by means of bolts 17 to the bottom ends 2A and 6A, respectively, of the handle element 1A and arm 7A.

In operation, with the parts in their full line positions shown in Figure 1, the hand grip and ball 14 are held by both hands of the operator and the tool is thereby thrust downwardly into the ground to a starting position. Following this the operator places his foot on the angular integral portion 9 of the actuating lever 10 and by pressure thereon further forces the tool until the blades reach the desired depth in the ground. For gripping the ground so that it may be lifted the operator swings the actuating lever 10 off the vertical a sufficient distance to force the blades 4 and 5 toward each other sufficiently to enable them to be removed freely from the hole thus formed. As the lever 10 is swung away from the handle 1 its integral right angular portion 9 will fulcrum about the pivot 8, at the same time forcing the inner end of portion 9 and the bottom end of the lever 10 upwardly relative to the handle as the pivot bolt 12 slides within the slot 11, thereby moving the blades 4 and 5 toward each other as aforesaid by the inward pull on the top end of the arm 7 by the portion 9 of the lever 10. The actuating lever is shown by broken lines in a position at the limit of its operative range, which would seldom be reached, since the tool may be removed from the ground by only slight movement of the blades 4 and 5 toward each other as aforesaid. In the event the actuating lever should fall to the extreme horizontal position, any shearing force on the bolt 12 would be prevented by the angular portion 9 first coming into contact with the web of the angle iron of which the handle element is made. The web of the handle element also provides a limit stop for the actuating lever when it is returned to the vertical inoperative position shown in full lines in Figure 1.

While we have shown a particular form of embodiment of our invention we are aware that many minor changes therein will readily suggest themselves to others skilled in the art without departing from the spirit and scope of the invention. Having thus described our invention what we claim as new and desire to protect by Letters Patent is:

1. A digging tool comprising in combination an elongated vertical handle having a lower end, a fixed blade secured to the lower end and extending downwardly and parallel to the handle, an arm pivoted to the lower end of the handle and normally extending upwardly and slightly outwardly therefrom, a movable blade carried by the arm and movable thereby from a normal position opposed and parallel to the fixed blade to an angular position inclined toward the fixed blade, said handle having an axial slot, transverse pivot means slidable in the slot, a vertical lever disposed alongside the handle and having a lower end pivotally carried by the pivot means and terminating in an integral right angular portion pivotally connected intermediate its ends to the top end of said arm and adapted to serve as a foot rest for applying downward pressure to the tool whereby upon release of foot pressure and tilting of said lever relative to the handle said movable blade will be moved toward the fixed blade upon upward movement of the pivot means in said slot and the resultant swing of said arm and said right angular portion of the lever toward said handle.

2. A digging tool as claimed in claim 1, wherein said handle is right angular in cross section and one flange carries the pivot means, while the other acts as a stop to locate the lever in a vertical position alongside the first flange.

3. A digging tool as claimed in claim 1, wherein means is provided for adjustably securing the blades to the lower end of the handle and to the arm so that the blades may be vertically individually adjusted relative to the handle and to the arm.

(References on following page)

References Cited in the file of this patent

UNITED STATES PATENTS

| | | |
|---|---|---|
| 192,282 | Rhodes | June 19, 1877 |
| 226,118 | Scheidler | Mar. 30, 1880 |
| 281,193 | Kohler | July 10, 1883 |
| 318,359 | Davis | May 19, 1885 |
| 501,594 | Tandy | July 18, 1893 |
| 1,162,845 | Armstrong | Dec. 7, 1915 |
| 1,205,414 | Titus | Nov. 21, 1916 |
| 1,576,798 | Spiegel | Mar. 16, 1926 |
| 1,860,963 | Smith | May 31, 1932 |
| 2,014,311 | Council | Sept. 10, 1935 |
| 2,149,630 | Richter | Mar. 7, 1939 |

FOREIGN PATENTS

| | | |
|---|---|---|
| 49,583 | Germany | Nov. 8, 1889 |